United States Patent
King, III

(10) Patent No.: US 6,872,764 B2
(45) Date of Patent: Mar. 29, 2005

(54) STABILIZED GAMMA IRRADIATED POLYOLEFINS

(75) Inventor: Roswell E. King, III, Pleasantville, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 15 days.

(21) Appl. No.: 10/372,751

(22) Filed: Feb. 24, 2003

(65) Prior Publication Data

US 2003/0195282 A1 Oct. 16, 2003

Related U.S. Application Data

(63) Continuation of application No. 09/783,256, filed on Feb. 14, 2001, now Pat. No. 6,664,317
(60) Provisional application No. 60/183,528, filed on Feb. 18, 2000.

(51) Int. Cl.[7] .................. C08K 5/3435; C08K 5/3477; C08K 5/1535
(52) U.S. Cl. .................. 524/102; 524/99; 524/100; 524/102; 524/126; 524/128; 524/136; 524/139; 524/147; 524/153; 522/75; 522/76; 522/78; 522/79; 522/150; 522/157; 522/161
(58) Field of Search .................. 524/99–102, 111, 524/126, 128, 136, 139, 147, 13, 153; 522/75–79, 150, 157, 161

(56) References Cited

U.S. PATENT DOCUMENTS

| | | | |
|---|---|---|---|
| 4,590,231 A | 5/1986 | Seltzer et al. | 524/100 |
| 4,649,221 A | 3/1987 | Ravichandran et al. | 564/300 |
| 4,668,721 A | 5/1987 | Seltzer et al. | 524/95 |
| 4,691,015 A | 9/1987 | Behrens et al. | 544/198 |
| 4,703,073 A | 10/1987 | Winter et al. | 524/99 |
| 4,782,105 A | 11/1988 | Ravichandran et al. | 524/236 |
| 4,797,438 A | 1/1989 | Kletecka et al. | 524/100 |
| 4,876,300 A | 10/1989 | Seltzer et al. | 524/100 |
| 5,096,950 A | 3/1992 | Galbo et al. | 524/99 |
| 5,122,593 A | 6/1992 | Jennings et al. | 524/100 |
| 5,516,920 A | 5/1996 | Nesvadba et al. | 549/307 |
| 5,559,167 A | 9/1996 | Mahood | 523/136 |
| 5,596,033 A | 1/1997 | Horsey et al. | 524/100 |
| 5,614,572 A | 3/1997 | Nesvadba et al. | 524/111 |
| 5,834,541 A | 11/1998 | Becker et al. | 524/119 |
| 5,844,029 A | 12/1998 | Prabhu et al. | 524/236 |
| 5,880,191 A * | 3/1999 | Prabhu et al. | 524/236 |
| 5,922,794 A | 7/1999 | Prabhu et al. | 524/236 |
| 5,994,436 A | 11/1999 | Pierson | 524/236 |
| 6,172,153 B1 | 1/2001 | Starsinic | 524/400 |
| 6,376,584 B1 * | 4/2002 | Galbo et al. | 524/102 |

FOREIGN PATENT DOCUMENTS

EP 0924251 6/1999

* cited by examiner

Primary Examiner—Peter Szekely
(74) Attorney, Agent, or Firm—Tyler A. Stevenson

(57) ABSTRACT

Certain essentially phenol antioxidant-free stabilizer systems that comprise either a binary hindered amine/hydroxylamine or nitrone or amine oxide or benzofuranone system or a ternary hindered amine/hydroxylamine or nitrone or amine oxide or benzofuranone/organic phosphite or phosphonite system are especially effective towards protecting polyolefins against the deleterious effects of gamma irradiation. Polyolefin articles such as medical packaging, hospital garments, draperies, woven and non-woven fiber products, surgery utensils, blow-molded I.V. bottles, hypodermic syringes, needle shields, laboratory ware such as trays, funnels, Petri dishes and filters, and hygiene related articles may be sterilized with gamma irradiation and are stabilized according to the present invention.

14 Claims, No Drawings

STABILIZED GAMMA IRRADIATED POLYOLEFINS

This application is a continuation of U.S. application Ser. No. 09/783,256, filed Feb. 14, 2001, now U.S. Pat. No. 6,664,317, which claims the benefit under 35 USC 119(e) of U.S. Provisional Application Ser. No. 60/183,528 filed on Feb. 18, 2000.

The present invention relates to the stabilization of gamma irradiated polyolefin fibers, films and molded articles. Specifically, certain non-phenolic binary and ternary stabilization systems are especially effective.

Polyolefin materials are making significant inroads into areas where the item can be pre-sterilized, used for the intended purpose, and then properly disposed of. The shift from glass, metal and cloth to polyolefin based fibers and articles is driven by lower cost, greater convenience, and growing concerns related to handling of hazardous waste generated by some health science related procedures. Polyolefins are useful in a variety of end use applications where sterilization with gamma irradiation is employed, see for example U.S. Pat. Nos. 4,797,438, 5,122,593 and 5,559,167, all incorporated herein by reference. Polyolefin medical packaging, hospital garments, surgery utensils, blow-molded I.V. bottles, hypodermic syringes, needle shields, laboratory ware such as trays, funnels, Petri dishes and filters, and hygiene related articles may all require sterilization with gamma irradiation.

Sterilization can be achieved by exposure to about 0.5 to about 10 megarads of gamma irradiation. This can be done over a period of time, for example, about 1 minute to about 24 hours.

This sterilization technique is successful towards eliminating unwanted organisms and bacteria but places a significant stress on the properties of the polyolefin. Physical properties such as strength and toughness and aesthetic properties such as color, taste and odor of the polyolefin fibers and articles are affected. The sterilized fibers and articles must be able to function without cracking, bending, breaking, shredding or tearing during the intended use. Likewise, they must have low initial color and maintain low color throughout their lifetime.

U.S. Pat. No. 4,797,438 discloses polypropylene articles which are sterilized with gamma irradiation and stabilized with hindered amines of the class of polysubstituted piperazinones. U.S. Pat. No. 5,122,593 discloses polypropylene fibers stabilized against the harmful effects of gamma irradiation with the incorporation of an N-(substituted)-1-(piperazine-2-one alkyl)-α-(3,5-dialkyl-4-hydroxyphenyl)-α,α-substituted acetamide. U.S. Pat. No. 5,559,167 teaches a method for enhancing the resistance of polymeric articles to discoloration incurred by gamma irradiation with the incorporation of one of a particular class of phosphite stabilizers.

There remains a need to supply to industry fully formulated polyolefin feedstocks that can resist the damaging effects of high energy radiation. It has now been found that certain specific binary and ternary stabilizer combinations satisfy this need. The stabilizer systems of the instant invention are essentially phenol antioxidant-free and comprise either a binary hindered amine/hydroxylamine or nitrone or amine oxide or benzofuranone system or a ternary hindered amine/hydroxylamine or nitrone or amine oxide or benzofuranone/organic phosphite or phosphonite system.

Hydroxylamine derivatives, such as N,N,-dialkylhydroxylamines and N,N-dibenzylhydroxylaamine, are well known as useful stabilizers for a variety of polymeric substrates as is taught for example in U.S. Pat. Nos. 4,590,231, 4,668,721, 4,782,105 and 4,876,300, the relevant parts of which are incorporated herein by reference.

U.S. Pat. Nos. 4,649,221, 4,691,015 and 4,703,073 teach the use of polyhydroxylamine compounds, hydroxylamines derived from hindered amines and alkylated N,N-dibenzylhydroxylamine derivatives, respectively, with one or more compounds selected from the group of phenolic antioxidants, hindered amine light stabilizers, alkylated hydroxybenzoate light stabilizers, ultraviolet light absorbers, organic phosphorus compounds, alkaline metal salts of fatty acids and thiosynergists towards stabilizing polyolefins. All three patents teach that the polyolefin compositions are stabilized against degradation and/or discoloration upon exposure to heating at elevated temperatures, to the combustion products of natural gas, to gamma irradiation or to prolonged storage at ambient temperature.

U.S. Pat. No. 4,782,105 discloses the use of long chain N,N-dialkylhydroxylamines for the stabilization of poly (arylene sulfides) and unsaturated elastomers. Examples are shown where long chain N,N-dialkylhydroxylamines are used together with phosphite stabilizers in styrene/butadiene copolymer.

U.S. Pat. No. 4,876,300 discloses the use of long chain N,N-dialkylhydroxylamines as process stabilizers for polyolefin compositions. Examples are shown where long chain N,N-dialkylhydroxylamines are used together with phosphite stabilizers and also where they are used together with hindered amine stabilizers.

U.S. Pat. Nos. 4,590,231 and 4,668,721 disclose the use of N,N-dibenzylhydroxylamine or other hydroxylamine derivatives together with metal salts of fatty acids and phenolic antioxidants for the stabilization of polyolefin compositions. The compositions may also contain organic phosphorus compounds or hindered amine stabilizers. It is mentioned that the polyolefin compositions are stabilized against degradation and/or discoloration upon exposure to heating at elevated temperatures, to the combustion products of natural gas, to gamma irradiation or to prolonged storage at ambient temperature.

U.S. Pat. Nos. 5,844,029, 5,880,191 and 5,922,794 disclose the use of saturated hydrocarbon amine oxides towards the stabilization of thermoplastic resins. It is disclosed that the thermoplastic compositions may further contain a stabilizer or mixture of stabilizers selected from phenolic antioxidants, hindered amine light stabilizers, ultraviolet light absorbers, organic phosphorus compounds, alkaline metal salts of fatty acids and thiosynergists. The co-use of amine oxides with other stabilizers towards stabilizing polyolefins is not exemplified.

Benzofuranone stabilizers are known and are described for example in U.S. Pat. Nos. 5,516,920 and 5,614,572. These patents teach that benzofuranone stabilizers are suitable towards protecting organic materials including polyolefins against thermal, oxidative or light-induced degradation.

DETAILED DISCLOSURE

The present invention relates to a polyolefin article of manufacture of improved strength and/or discoloration resistance, said article being essentially phenol antioxidant-free and having incorporated therein a stabilizer system sufficient to attenuate the deleterious effects of gamma irradiation, said stabilizer system comprising (a) one or more hindered amine stabilizers,
(b) one or more compounds selected from the group consisting of
  i.) hydroxylamine stabilizers,
  ii.) nitrone stabilizers,
  iii.) amine oxide stabilizers and
  iv.) benzofuranone stabilizers; and optionally
(c) one or more compounds selected from the group of organic phosphites and phosphonites, said article having been subjected to one or more doses of gamma irradiation.

The present invention is also aimed at a method for imparting strength and/or discoloration resistance to gamma irradiated polyolefin articles, which articles are essentially phenol antioxidant-free, which comprises incorporating therein a stabilizer system as described above, in an amount sufficient to attenuate the deleterious effects of gamma irradiation.

Essentially phenol antioxidant-free in the context of this invention means that the present compositions and methods comprise either no phenolic antioxidants or only trace amounts thereof. Trace amounts are amounts that impart inconsequential effects or are inadequate to be judged as effective.

Component (a) employed in the novel process is at least one compound that contains at least one group of the formula (I)

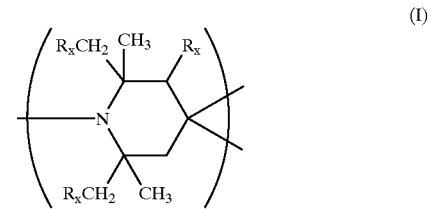

(I)

in which $R_x$ is hydrogen or methyl. The compounds of component (a) are for example, of high molecular weight and may be discrete compounds or oligomeric mixtures.

For example, hindered amines of component (a) are:

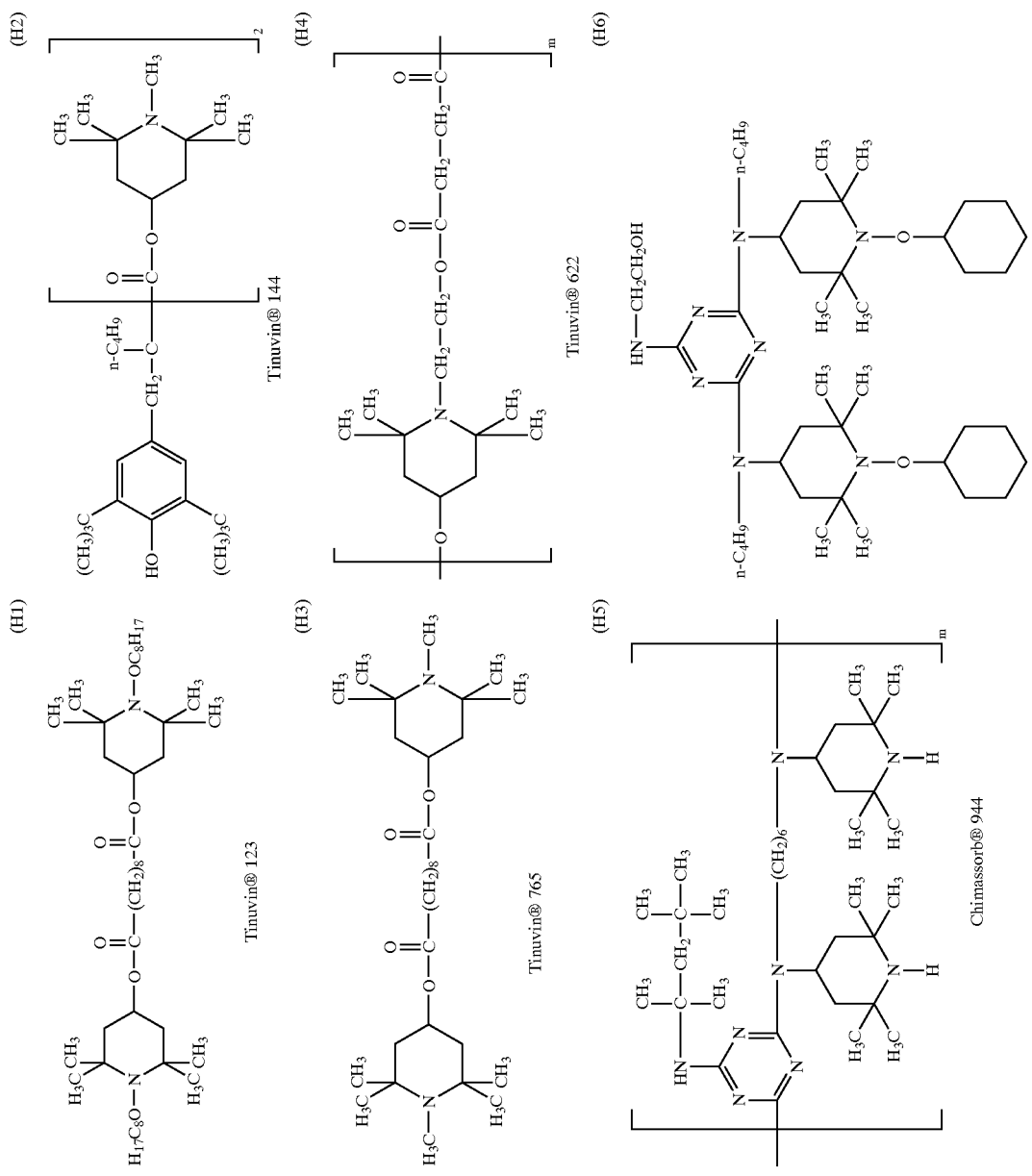

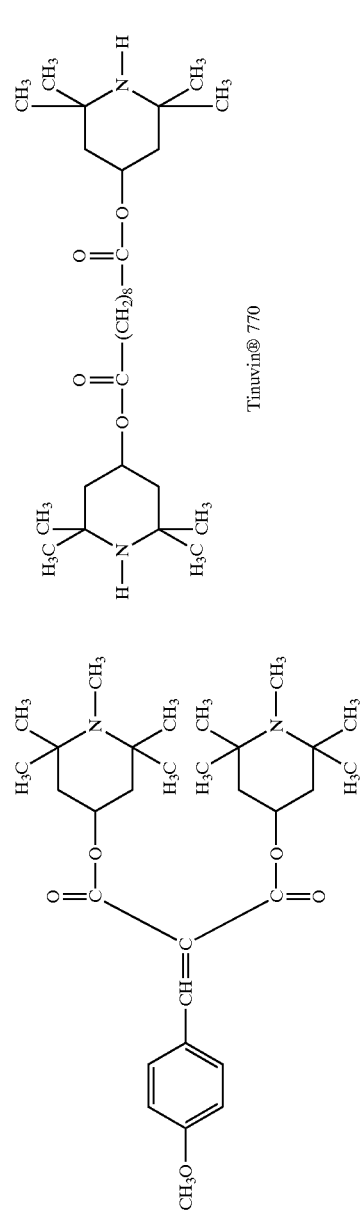
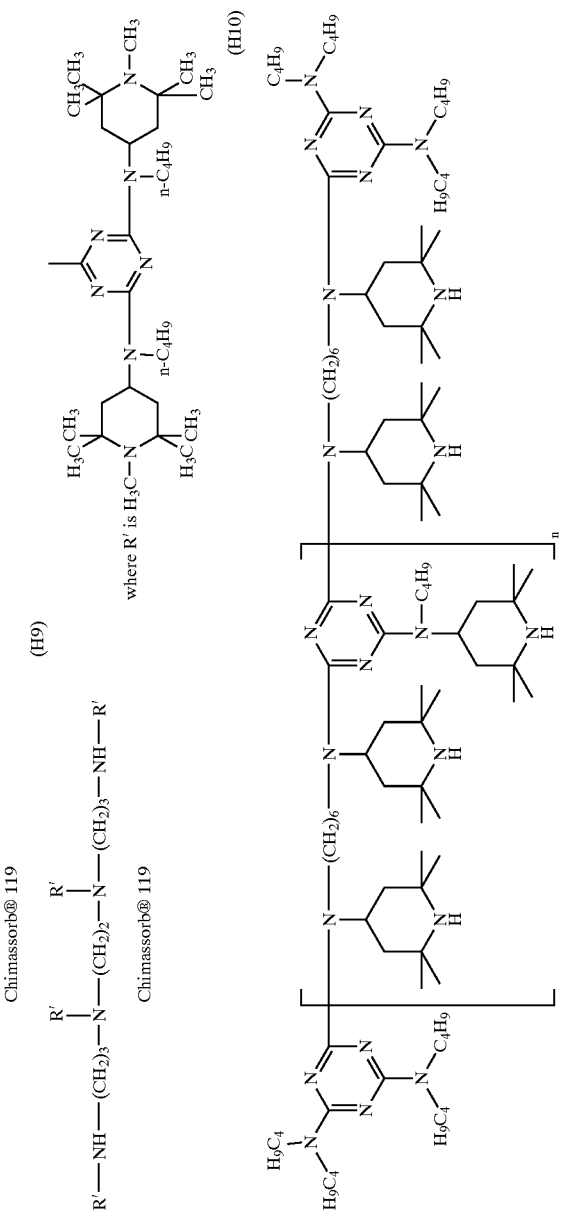

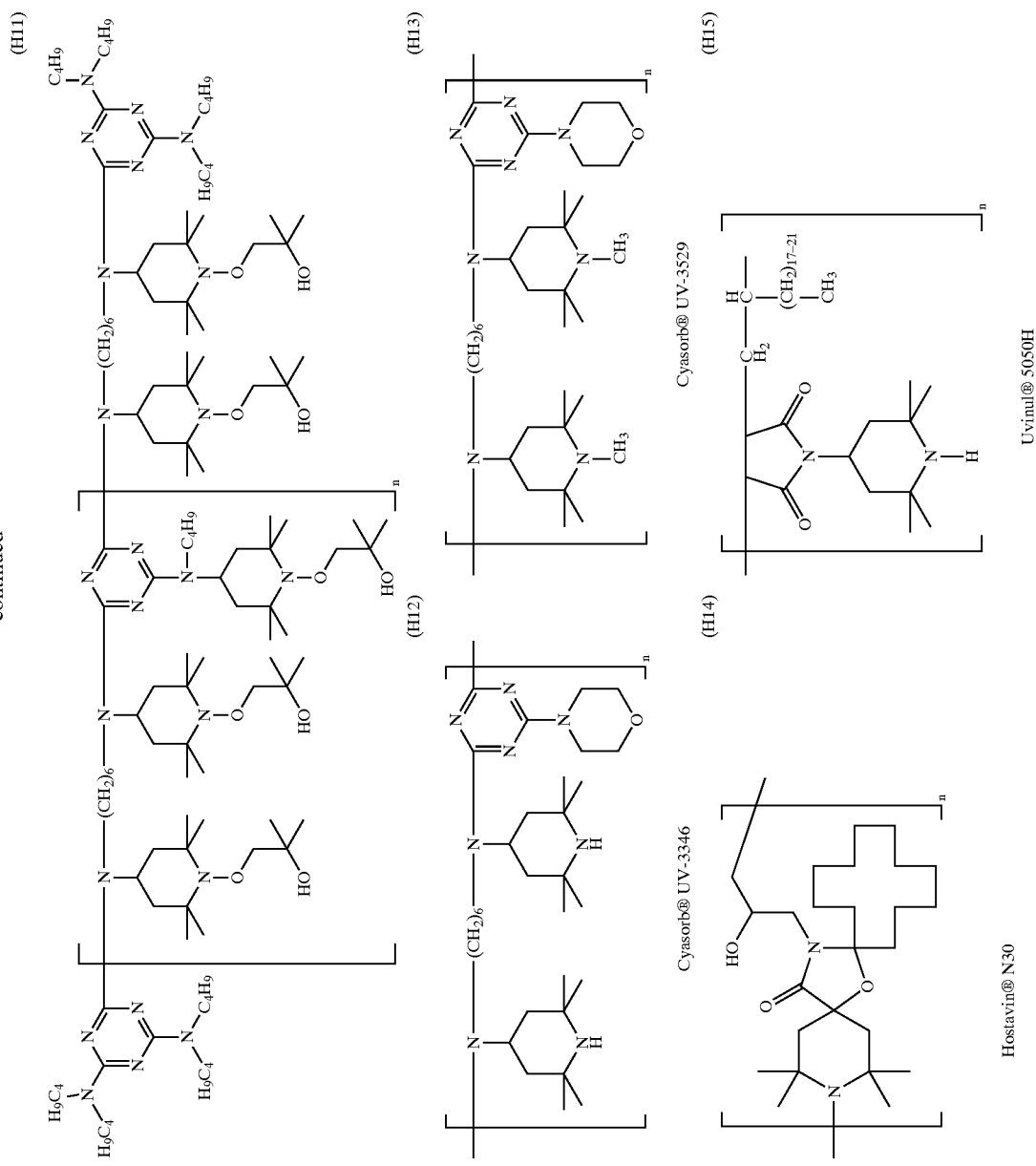

-continued
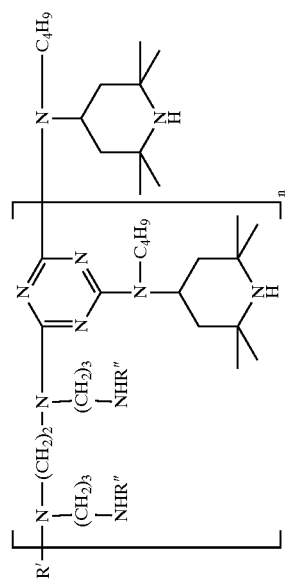
(H16)
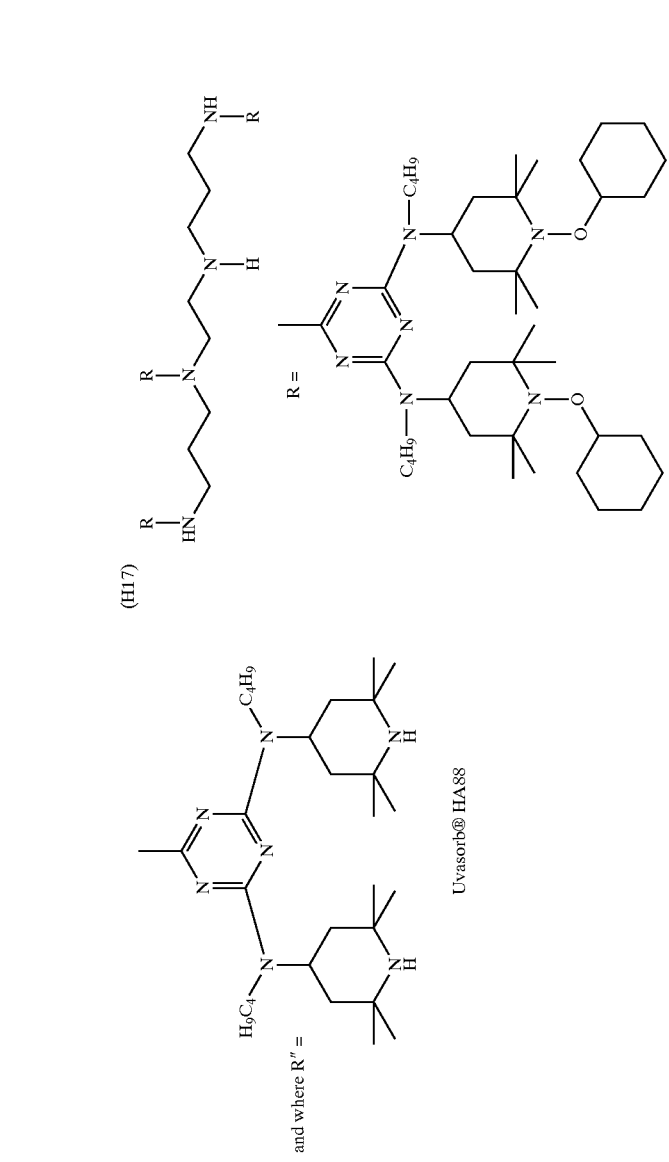
(H17)
(H18)
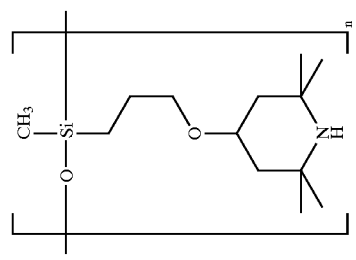
Uvasil® 299

-continued
(H19)
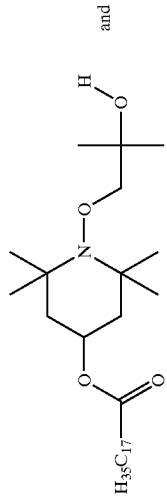
and
(H20)
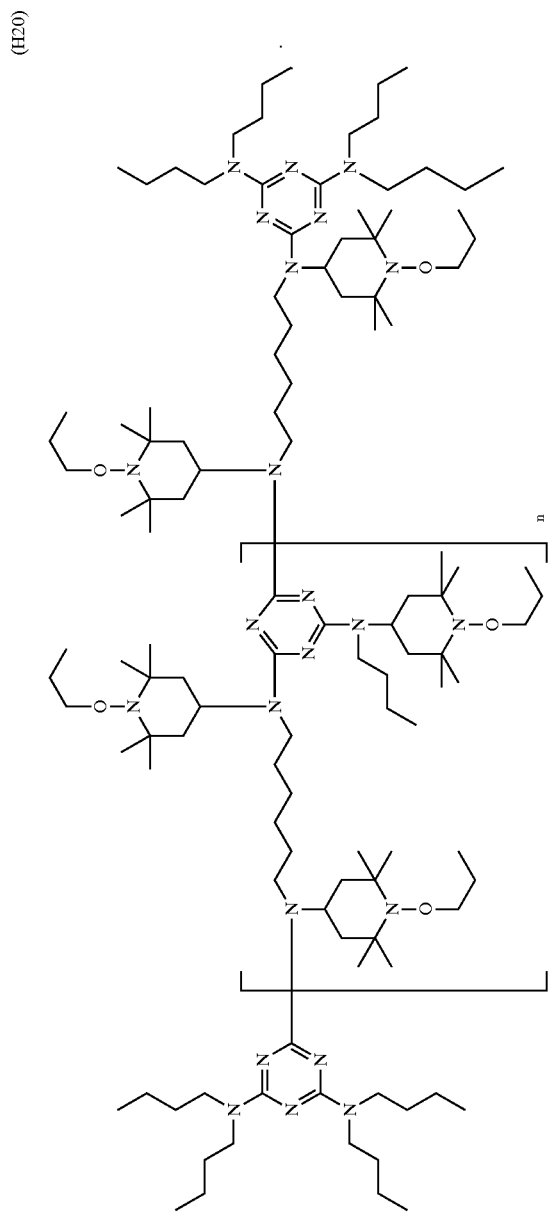

The compounds of the sterically hindered amine type are known and some are commercially available.

The sterically hindered amines may be selected from those of the class of hydroxy-substituted N-alkoxy hindered amines, as disclosed in copending U.S. application Ser. No. 09/505,529, which application is hereby incorporated by reference.

Tinuvin® and Chimassorb® are protected trade names of Ciba Specialty Chemicals Corp. Sanduvor® and Hostavin® are protected trade names of Clariant. Cyasorb® is a protected trade name of Cytec Corporation. Uvinul® is a protected trade name of BASF. Uvasil® is a protected trade name of Enichem, now Great Lakes Chemical. Uvasorb® is a protected trade name of 3V Sigma.

The hindered amines of component (a) are used in amounts of about 0.01% to about 10%, for example from about 0.05% to about 5%, typically from about 0.1% to about 1% by weight, based on the weight of the polyolefin article to be stabilized.

The hydroxylamine derivatives of component i.) employed in the novel compositions and methods are of the formula (II)

wherein $T_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms;

$T_2$ is hydrogen, or independently has the same meaning as $T_1$.

In the present invention the compounds of component i.) are, for example, N,N-dihydrocarbylhydroxylamines of formula (II) wherein $T_1$ and $T_2$ are independently benzyl, methyl, ethyl, octyl, lauryl, dodecyl, tetradecyl, hexadecyl, heptadecyl or octadecyl, or wherein $T_1$ and $T_2$ are each the alkyl mixture found in hydrogenated tallow amine.

The compounds of component i.) in the present compositions and methods are, for example, N,N-dihydrocarbylhydroxylamines selected from the group consisting of N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine and N,N-di(hydrogenated tallow)hydroxylamine.

Component i.) in the present invention may be for example the N,N-di(alkyl)hydroxylamine produced by the direct oxidation of N,N-di(hydrogenated tallow)amine (Irgastab® FS-042, Ciba Specialty Chemicals Corp.).

The nitrones of component ii.) may be the corresponding oxidation products of the hydroxylamines of component i.). That is to say, the nitrones of component ii.) are nitrone analogues of the hydroxylamines of component i.). The nitrones may be for example, N-benzyl-α-phenylnitrone, N-ethyl-α-methylnitrone, N-octyl-α-heptylnitrone, N-lauryl-α-undecylnitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone and the nitrone derived from N,N-di(hydrogenated tallow)hydroxylamine.

The amine oxide derivatives of component iii.) are saturated tertiary amine oxides as represented by general formula (III):

wherein $G_1$ and $G_2$ are independently a straight or branched chain alkyl of 6 to 36 carbon atoms, aryl of 6 to 12 carbon atoms, aralkyl of 7 to 36 carbon atoms, alkaryl of 7 to 36 carbon atoms, cycloalkyl of 5 to 36 carbon atoms, alkcycloalkyl of 6 to 36 carbon atoms or cycloalkylalkyl of 6 to 36 carbon atoms;

$G_3$ is a straight or branched chain alkyl of 1 to 36 carbon atoms, aryl of 6 to 12 carbon atoms, aralkyl of 7 to 36 carbon atoms, alkaryl of 7 to 36 carbon atoms, cycloalkyl of 5 to 36 carbon atoms, alkcycloalkyl of 6 to 36 carbon atoms or cycloalkylalkyl of 6 to 36 carbon atoms; with the proviso that at least one of $G_1, G_2$ and $G_3$ contains a β carbon-hydrogen bond; and wherein said alkyl, aralkyl, alkaryl, cycloalkyl, alkcycloalkyl and cycloalkylalkyl groups may be interrupted by one to sixteen —O—, —S—, —SO—, —SO$_2$—, —COO—, —OCO—, —CO—, —NG$_4$-, —CONG$_4$- and —NG$_4$CO— groups, or wherein said alkyl, aralkyl, alkaryl, cycloalkyl, alkcycloalkyl and cycloalkylalkyl groups may be substituted by one to sixteen groups selected from —OG$_4$, —SG$_4$, —COOG$_4$, —OCOG$_4$, —COG$_4$, —N(G$_4$)$_2$, —CON(G$_4$)$_2$, —NG$_4$COG$_4$ and 5- and 6-membered rings containing the —C(CH$_3$)(CH$_2$R$_x$)NL(CH$_2$R$_x$)(CH$_3$)C— group or wherein said alkyl, aralkyl, alkaryl, cycloalkyl, alkcycloalkyl and cycloalkylalkyl groups are both interrupted and substituted by the groups mentioned above; and wherein $G_4$ is independently hydrogen or alkyl of 1 to 8 carbon atoms;

$R_x$ is hydrogen or methyl;

L is a $C_{1-30}$ straight or branched chain alkyl moiety, a —C(O)R moiety wherein R is a $C_{1-30}$ straight or branched chain alkyl group, or a —OR moiety wherein R is a $C_{1-30}$ straight or branched chain alkyl group; and wherein said aryl groups may be substituted by one to three halogen, alkyl of 1 to 8 carbon atoms, alkoxy of 1 to 8 carbon atoms or combinations thereof.

Examples of structures of formula (III) are where $G_1$ and $G_2$ are independently benzyl or substituted benzyl. It is also possible for each of $G_1$, $G_2$, and $G_3$ to be the same residue. $G_1$ and $G_2$ may also independently be alkyl groups of 8 to 26 carbon atoms, for example alkyl groups of 10 to 26 carbon atoms. $G_3$ may be an alkyl group of 1 to 22 carbon atoms, for example methyl or substituted methyl. Also, the present amine oxides include those wherein $G_1$, $G_2$, and $G_3$ are the same alkyl groups of 6 to 36 carbon atoms. The aforementioned residues for $G_1$, $G_2$, and $G_3$ are, for instantce, saturated hydrocarbon residues or saturated hydrocarbon residues containing at least one of the aforementioned —O—, —S—, —SO—, —CO$_2$—, —CO—, or —CON— moieties. Those skilled in the art will be able to envision other useful residues for each of $G_1$, $G_2$, and $G_3$ without detracting from the present invention.

The saturated amine oxides of component iii.) may also includes poly(amine oxides). By poly(amine oxide) is meant tertiary amine oxides containing at least two tertiary amine oxides per molecule. Illustrative poly(amine oxides), also called "poly(tertiary amine oxides)", include the tertiary amine oxide analogues of aliphatic and alicyclic diamines such as, for example, 1,4-diaminobutane; 1,6-diaminohexane; 1,10-diaminodecane; and 1,4-diaminocyclohexane, and aromatic based diamines such as, for example, diamino anthraquinones and diaminoanisoles.

Also included as component iii.) are tertiary amine oxides derived from oligomers and polymers of the aforementioned diamines. Useful amine oxides also include amine oxides attached to polymers, for example, polyolefins, polyacrylates, polyesters, polyamides, polystyrenes, and the like. When the amine oxide is attached to a polymer, the average number of amine oxides per polymer can vary widely as not all polymer chains need to contain an amine oxide. All of the aforementioned amine oxides may optionally contain at least one —O—, —S—, —SO—, —CO$_2$, —CO—, or —CONG$_4$-moiety. For instance, each tertiary amine oxide of the polymeric tertiary amine oxide may contain a $C_1$ residue.

The groups $G_1$, $G_2$ and $G_3$ of formula (III) may be attached to a molecule containing a hindered amine. Hindered amines are known in the art and the amine oxide of the present invention may be attached to the hindered amine in any manner and structural position of the hindered amine. Useful hindered amines when part of a compound of component iii.) include those of the general formulas (IV) and (V):

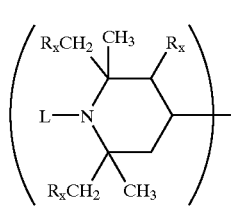
(IV)

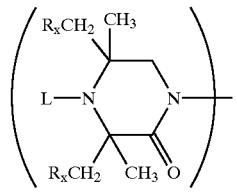
(V)

wherein L and $R_x$ are as described above. Also included are amine oxides containing more than one hindered amine and more than one saturated amine oxide per molecule. The hindered amine may be attached to a poly(tertiary amine oxide) or attached to a polymeric substrate, as discussed above.

The benzofuranone stabilizers of component iv.) are those disclosed for example in U.S. Pat. Nos. 4,325,863; 4,338,244; 5,175,312; 5,216,052; 5,252,643; 5,369,159; 5,488,117; 5,356,966; 5,367,008; 5,428,162; 5,428,177; 5,614,572; 5,883,165 or 5,516,920, all incorporated herein by reference, or 3-(4-(2-acetoxyethoxy)phenyl)-5,7-di-tert-butyl-benzofuran-2-one, 5,7-di-tert-butyl-3-(4-(2-stearoyloxyethoxy)phenyl)benzofuran-2-one, 3,3'-bis(5,7-di-tert-butyl-3-(4-(2-hydroxyethoxy)phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

For example, component iv.) is one or more benzofuranone stabilizers selected from:

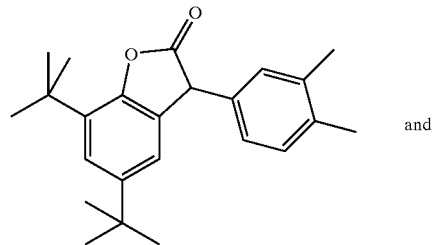
(BF1)

and

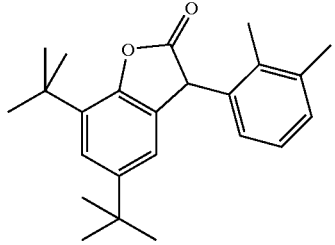
(BF2)

The compounds of component (b) are used in amounts, in total, of about 0.0005% to about 2%, for example, from about 0.005% to about 1%, typically from about 0.01% to about 0.5% by weight, based on the weight of the polyolefin article to be stabilized.

Component (c) is at least one compound selected from the formulae (1), (2), (3), (4), (5), (6) and (7)

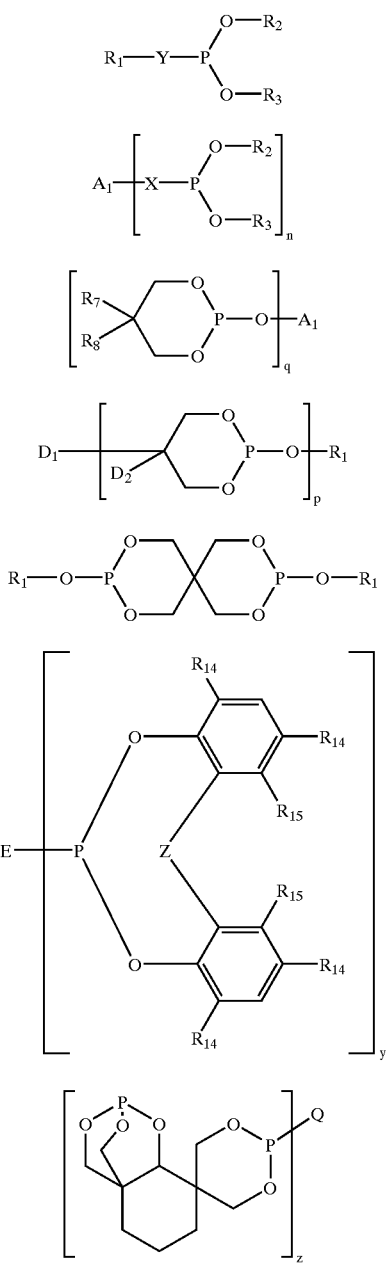

(1)
(2)
(3)
(4)
(5)
(6)
(7)

in which the indices are integral and n is 2, 3 or 4; p is 1 or 2; q is 2 or 3; r is 4 to 12; y is 1, 2 or 3; and z is 1 to 6;

$A_1$, if n is 2, is $C_2$–$C_{18}$ alkylene; $C_2$–$C_{12}$ alkylene interrupted by oxygen, sulfur or —$NR_4$—;

a radical of the formula

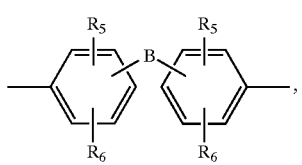

phenylene;

$A_1$, if n is 3, is a radical of the formula —$C_rH_{2r-1}$—;

$A_1$, if n is 4, is

$A_2$ is as defined for $A_1$ if n is 2;

B is a direct bond, —$CH_2$—, —$CHR_4$—, —$CR_1R_4$—, sulfur, $C_5$–$C_7$ cycloalkylidene, or cyclohexylidene which is substituted by from 1 to 4 $C_1$–$C_4$ alkyl radicals in position 3, 4 and/or 5;

$D_1$, if p is 1, is $C_1$–$C_4$ alkyl and, if p is 2, is —$CH_2OCH_2$—;

$D_2$, if p is 1, is $C_1$–$C_4$ alkyl;

E, if y is 1, is $C_1$–$C_{18}$ alkyl, —$OR_1$ or halogen;

E, if y is 2, is —O-$A_2$-O—,

E, if y is 3, is a radical of the formula $R_4C(CH_2O—)_3$ or $N(CH_2CH_2O—)_3$;

Q is the radical of an at least z-valent alcohol or phenol, this radical being attached via the oxygen atom to the phosphorus atom;

$R_1$, $R_2$ and $R_3$ independently of one another are $C_1$–$C_{18}$ alkyl which is unsubstituted or substituted by halogen, —$COO_4$, —CN or —$CONR_4R_4$; $C_2$–$C_{18}$ alkyl interrupted by oxygen, sulfur or —$NR_4$—; $C_7$–$C_9$ phenylalkyl; $C_5$–$C_{12}$ cycloalkyl, phenyl or naphthyl; naphthyl or phenyl substituted by halogen, 1 to 3 alkyl radicals or alkoxy radicals having a total of 1 to 18 carbon atoms or by $C_7$–$C_9$ phenylalkyl; or a radical of the formula in which m is an integer from the range 3 to 6;

$R_4$ is hydrogen, $C_1$–$C_{18}$ alkyl, $C_5$–$C_{12}$ cycloalkyl or $C_7$–$C_9$ phenylalkyl, $R_5$ and $R_6$ independently of one another are hydrogen, $C_1$–$C_8$ alkyl or $C_5$–$C_6$ cycloalkyl, $R_7$ and $R_8$, if q is 2, independently of one another are $C_1$–$C_4$ alkyl or together are a 2,3-dehydropentamethylene radical; and $R_7$ and $R_8$, if q is 3, are methyl;

$R_{14}$ is hydrogen, $C_1$–$C_9$ alkyl or cyclohexyl, $R_{15}$ is hydrogen or methyl and, if two or more radicals $R_{14}$ and $R_{15}$ are present, these radicals are identical or different, X and Y are each a direct bond or oxygen, Z is a direct bond, methylene, —$C(R_{16})_2$— or sulfur, and $R_{16}$ is $C_1$–$C_8$ alkyl, Of interest are compositions and methods wherein component (c) is at least one compound selected from the formulae (1), (2), (5) and (6), in which n is the number 2, and y is the number 1, 2 or 3;

$A_1$ is $C_2-C_{18}$ alkylene, p-phenylene or p-biphenylene,

E, if y is 1, is $C_1-C_{18}$ alkyl, $-OR_1$ or fluorine;

E, if y is 2, is p-biphenylene,

E, if y is 3, is $N(CH_2CH_2O-)_3$, $R_1$, $R_2$ and $R_3$ independently of one another are $C_1-C_{18}$ alkyl, $C_7-C_9$ phenylalkyl, cyclohexyl, phenyl, or phenyl substituted by 1 to 3 alkyl radicals having a total of 1 to 18 carbon atoms;

$R_{14}$ is hydrogen or $C_1-C_9$ alkyl, $R_{15}$ is hydrogen or methyl;

X is a direct bond,

Y is oxygen,

Z is a direct bond or $-CH(R_{16})-$, and $R_{16}$ is $C_1-C_4$ alkyl.

Likewise of interest are compositions and methods wherein component (c) is at least one compound selected from the formulae (1), (2), (5) and (6), in which n is the number 2 and y is the number 1 or 3;

$A_1$ is p-biphenylene,

E, if y is 1, is $C_1-C_{18}$alkoxy or fluorine,

E, if y is 3, is $N(CH_2CH_2O-)_3$, $R_1$, $R_2$ and $R_3$ independently of one another are $C_1-C_{18}$ alkyl, or phenyl substituted by 2 or 3 alkyl radicals having a total of 2 to 12 carbon atoms;

$R_{14}$ is methyl or tert-butyl;

$R_{15}$ is hydrogen;

X is a direct bond;

Y is oxygen; and

Z is a direct bond, methylene or $-CH(CH_3)-$.

Component (c) in the present invention may be at least one compound selected from the formulae (1), (2) and (6).

Component (c) in the present invention may be at least one compound of the formula (VI)

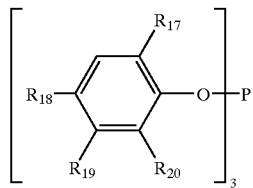

in which $R_{17}$ and $R_{18}$ independently of one another are hydrogen, $C_1-C_8$ alkyl, cyclohexyl or phenyl, and $R_{19}$ and $R_{20}$ independently of one another are hydrogen or $C_1-C_4$ alkyl.

The following compounds are examples of organic phosphites and phosphonites which are suitable for use in component (c):

Triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite (Irgafos® 168, Ciba Specialty Chemicals Corp.), diisodecyl pentaerythritol diphosphite, bis(2,4-di-tert-butylphenyl) pentaerythritol diphosphite (formula (D)), bis(2,6-di-tert-butyl-4-methylphenyl) pentaerythritol diphosphite (formula (E)), bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis (2,4-di-tert-butylphenyl) 4,4'-biphenylene-diphosphonite (Irgafos® P-EPQ, Ciba Specialty Chemicals Corp., formula (H)), 6-isooctyloxy-2,4,8,10-tetra-tert-butyl-dibenzo[d,f][1,3,2]dioxaphosphepin (formula (C)), 6-fluoro-2,4,8,10-tetra-tert-butyl-12-methyl-dibenzo[d,g][1,3,2]dioxaphosphocin (formula (A)), bis(2,4-di-tert-butyl-6-methylphenyl) methyl phosphite, bis(2,4-di-tert-butyl-6-methylphenyl) ethyl phosphite (formula (G)).

The following phosphites and phosphonites may be used in component (c) in the novel compositions and methods:

Tris(2,4-di-tert-butylphenyl) phosphite (Irgafos® 168, Ciba Specialty Chemicals Corp.), tris(nonylphenyl) phosphite,

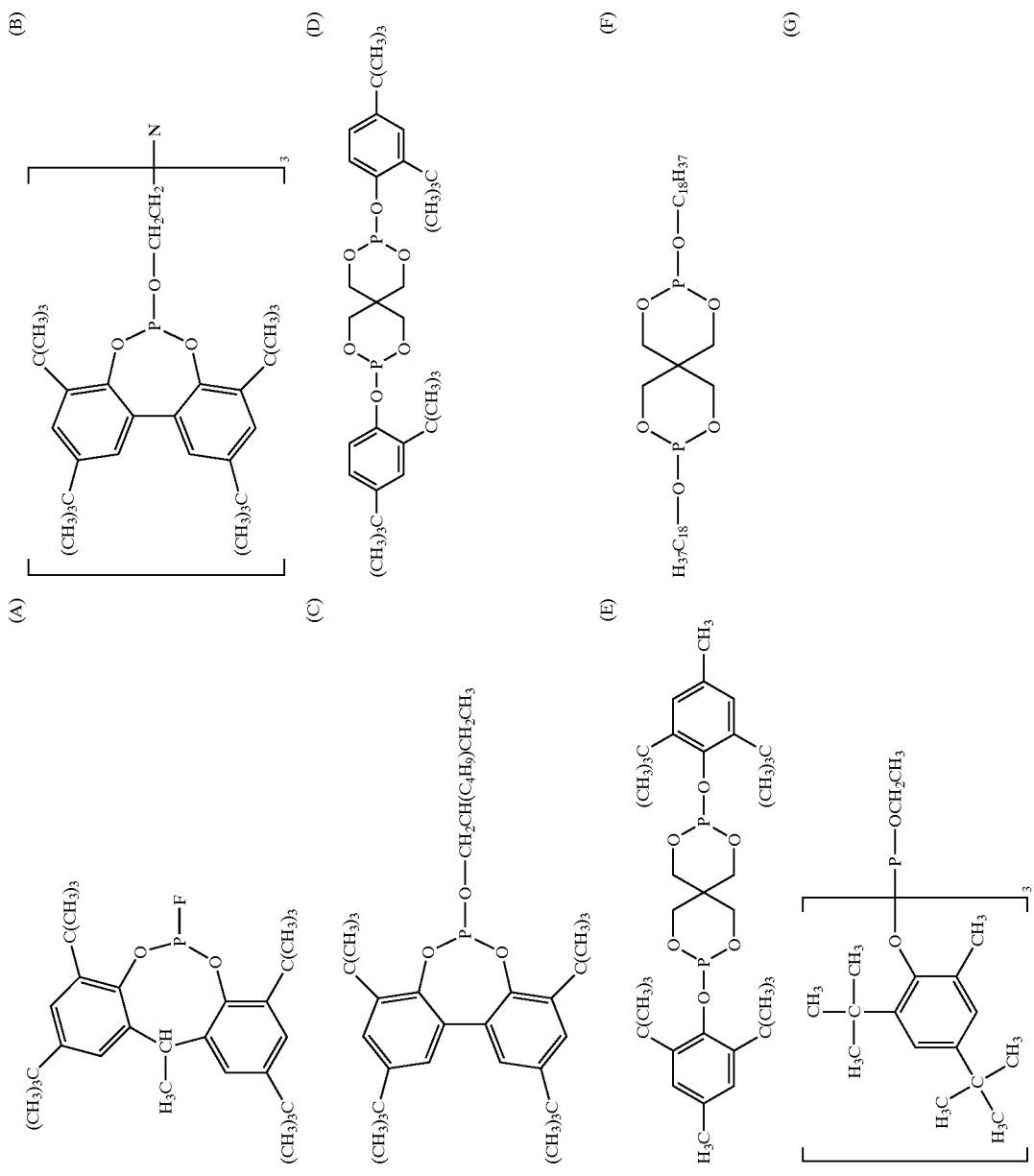

-continued
(H) 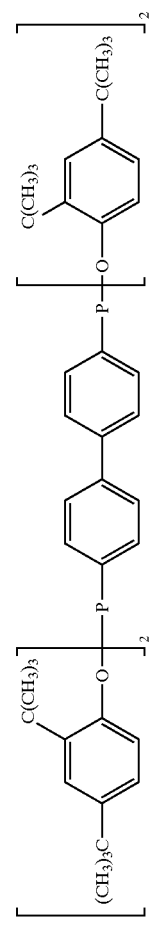
(J) 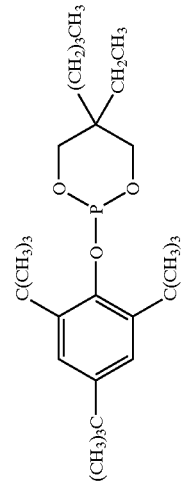
(K) 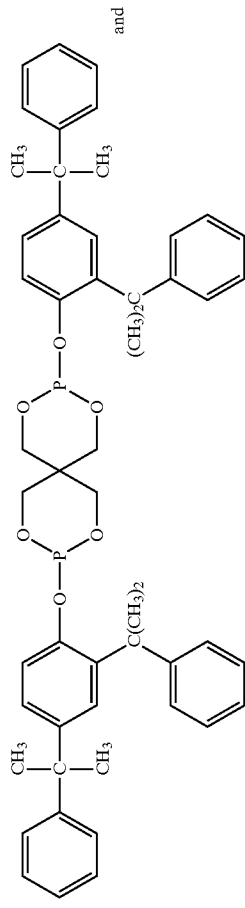
and
(L) 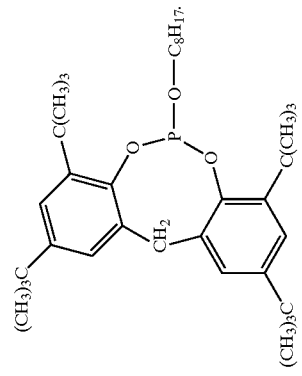

Component (c) in the novel compositions and methods of the present invention may for example be: Tris(2,4-di-tert-butylphenyl) phosphite (Irgafos® 168, Ciba Specialty Chemicals Corp.), bis(2,4-di-tert-butyl-6-methylphenyl) ethyl phosphite (Irgafos® 38, Ciba Specialty Chemicals Corp., formula (G)), bis(2,4-di-tert-butylphenyl) pentaerythritol diphosphite (Ultranox® 626, GE Chemicals, formula (D)), tetrakis(2,4-di-tert-butylphenyl)4,4'-biphenylenediphosphonite (Irgafos® P-EPQ, Ciba Specialty Chemicals Corp., formula (H)), 2,2',2"-nitrilo[triethyltris(3,3'5,5'-tetra-tert-butyl-1,1'-biphenyl-2,2'-diyl)phosphite] (Irgafos® 12, Ciba Specialty Chemicals Corp., formula (B)), Ultranox® 641 (GE Chemicals, formula (J)), Dover-phos® S9228 (Dover Chemicals, formula (K)) or Mark® HP10 (Adeka Argus, formula (L)).

These organic phosphites and phosphonites are known compounds; many of them are commercially available.

The organic phosphites or phosphonites of component (c) are used in amounts of about 0.01% to about 5%, for example, from about 0.025% to about 1%, typically from about 0.05% to about 0.5% by weight, based on the weight of the polyolefin article to be stabilized.

The stabilizer system of the present invention may for example comprise a ternary combination of components (a), (b) and (c) in which component (a) is one or more hindered amine compounds selected from (H5) Chimassorb® 944, (H4) Tinuvin® 622, (H10) Chimassorb® 2020, (H9) Chimassorb® 119 and (H8) Tinuvin® 770, component (b) is one or more compounds selected from
i.) an N,N-di(alkyl)hydroxylamine produced by the direct oxidation of N,N-di(hydrogenated tallow)amine (Irgastab® FS-042),
ii.) N-octadecyl-α-heptadecylnitrone,
iii.) Genox™ EP, a di($C_{16}$–$C_{18}$)alkyl methyl amine oxide, CAS# 204933-93-7, and
iv.) 3-(3,4-dimethylphenyl)-5,7-di-tert-butyl-benzofuran-2-one, Irganox® HP-136 (BF1), and component (c) is tris(2,4-di-tert-butylphenyl) phosphite (Irgafos® 168).

The commercial compounds are all available from Ciba Specialty Chemicals Corp, with the exception of Genox™ EP, available from GE Chemicals.

The polyolefin articles of manufacture of the present invention are any stabilized polyolefin that is subjected to a dose of gamma irradiation. For example laboratory ware, disposable medical articles, hygiene related articles and garments as described above. The articles may be molded articles such as hypodermic syringes or they may be articles produced from polyolefin fibers or polyolefin films.

The articles of manufacture may be formed from woven or non-woven polyolefin fiber fabrics. Non-woven fabrics of polyolefin may have a carded fiber structure or comprise a mat in which the fibers or filaments are distributed in a random array. The fibers may be bonded with a bonding agent such as a polymer, or the fibers may be thermally bonded without a bonding agent. The fabric may be formed by any one of numerous known processes including hydroentanglement or spun-lace techniques, or by air laying or melt-blowing filaments, batt drawing, stitchbonding, etc., depending upon the end use of the article to be made from the fabric.

The polyolefin articles are sterilized by exposure to about 0.5 to about 10 megarads of gamma irradiation.

Examples for polyolefins are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, for example polyethylene and polypropylene, can be prepared by different, and especially by the following, methods:

i) radical polymerization (normally under high pressure and at elevated temperature).

ii) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1.), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/odene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Polyolefins of the present invention are for example polypropylene homo- and copolymers and polyethylene homo- and copolymers. For instance, polypropylene, high density polyethylene (HDPE), linear low density polyethylene (LLDPE) and polypropylene random and impact copolymers.

In addition to components (a), (b) and (c) the novel compositions may comprise further costabilizers (additives) such as, for example, the following:

1. UV Absorbers 1.1 2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905; 4,853,471; 5,268,450; 5,278,314; 5,280,124; 5,319,091; 5,410,071; 5,436,349; 5,516,914; 5,554,760; 5,563,242; 5,574,166; 5,607,987 and 5,977,219, such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl) phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzo-triazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

1.2 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

1.3 Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

1.4 Acrylates and malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR25, dimethyl p-methoxybenzylidenemalonate (CAS#7443-25-6), and Sanduvor® PR31, di-(1,2,2,6,6-pentamethylpiperidin-4-yl) p-methoxybenzylidenemalonate (CAS #147783-69-5).

1.5 Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxailide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

1.6 Tris-aryl-o-hydroxyphenyl-s-triazines, for example known commercial tris-aryl-o-hydroxyphenyl-s-triazines and triazines as disclosed in, WO 96/28431, EP 434608, EP 941989, GB 2,317,893, U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,942,626; 5,959,008; 5,998,116 and 6,013,704, for example 4,6-bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxpethoxy)phenyl]-6-(4-chlorophenyl)-s-triazine, 2,4-bis[2-hydroxy-4-(2-hydroxy-4-(2-hydroxzethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl4-[2-hydroxy-4-(3-sec-butyloxy-2-hydroxypropyloxy)phenyl]-6-[2-hydroxy-4-(3-sec-amyloxy-2-hydroxy-propyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylsopropylideneoxy-phenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)-phenyl]-s-triazine, 2,4,6-tris[2-hydroxy-4-(3-sec-butyloxy-2-hydroxapropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

2. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyl oyl) oxalyl dihydrazide, N,N'-bis(salicyloyl)thiopropionyl dihydrazide.

3. Thiosynergists, for example, dilauryl thiodipropionate or distearyl thiodipropionate.

4. Peroxide scavengers, for example esters of b-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(b-dodecylmercapto)propionate.

5. Basic co-stabilizers, for example, melamine, polyvinylpyrrolidone, dicyandiamide, triallyl cyanurate, urea derivatives, hydrazine derivatives, amines, polyamides and polyurethanes.

6. Acid Scavengers, for example zinc oxide, calcium lactate, dihydrotalcite and alkali metal salts and alkaline earth metal salts of higher fatty acids for example calcium stearate, zinc stearate, magnesium behenate, magnesium stearate, sodium ricinoleate and potassium palmitate, antimony pyrocatecholate and zinc pyrocatecholate.

7. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

8. Clarifiers, for example substituted and unsubstituted bis-benzylidene sorbitols.

9. Fillers and reinforcing agents, for example, calcium carbonate, silicates, glass fibers, glass bulbs, asbestos, talc, kaolin, mica, barium sulfate, metal oxides and hydroxides, carbon black, graphite, wood flour and flours or fibers of other natural products, synthetic fibers.

10. Dispersing Agents, such as polyethylene oxide waxes or mineral oil.

11. Other additives, for example, plasticizers, lubricants, emulsifiers, pigments, rheology additives, catalysts, flow-control agents, optical brighteners, flameproofing agents, antistatic agents, clarifying agents and blowing agents.

The costabilizers are added, for example, in concentrations of from about 0.01% to about 10% by weight, based on the overall weight of the polyolefin to be stabilized.

The fillers and reinforcing agents (item 9 in the list), for example talc, calcium carbonate, mica or kaolin, are added to the polyolefins in concentrations of about 0.01% to about 40% by weight, based on the overall weight of the polyolefins to be stabilized.

The fillers and reinforcing agents (item 9 in the list), for example metal hydroxides, especially aluminum hydroxide or magnesium hydroxide, are added to the polyolefins in concentrations of about 0.01% to about 60% by weight, based on the overall weight of the polyolefins to be stabilized.

Carbon black as filler is added to the polyolefins in concentrations, judiciously, of from about 0.01% to about 5% by weight, based on the overall weight of the polyolefins to be stabilized.

Glass fibers as reinforcing agents are added to the polyolefins in concentrations, judiciously, of from about 0.01% to about 20% by weight, based on the overall weight of the polyolefins to be stabilized.

The present compositions and methods may comprise, in addition to components (a), (b) and/or (c) further additives as well, especially light stabilizers or processing stabilizers.

The incorporation of components (a), (b) and/or (c) and optional further additives into the polyolefin is carried out by known methods, for example before or after molding or also by applying the dissolved or dispersed stabilizer mixture to the polyolefin, with or without subsequent evaporation of the solvent. The stabilizer mixture of components (a), (b) and/or (c) and optional further additives can also be added to the polyolefins to be stabilized in the form of a masterbatch which contains these components in a concentration of, for example, about 2.5% to about 25% by weight.

Components (a), (b) and/or (c) and optional further additives can also be added before or during the polymerization or before crosslinking.

Components (a), (b) and/or (c) and optional further additives can be incorporated into the polyolefin to be stabilized in pure form or encapsulated in waxes, oils or polymers.

Components (a), (b) and/or (c) and optional further additives can also be sprayed onto the polyolefin to be stabilized. They are able to dilute other additives (for example the conventional additives indicated above) or their melts so that they can be sprayed also together with these additives onto the polyolefin to be stabilized. Addition by spraying during the deactivation of the polymerization catalysts is particularly advantageous, it being possible to carry out spraying using, for example, the steam used for deactivation.

In the case of spherically polymerized polyolefins it may, for example, be advantageous to apply components (a), (b) and/or (c), optionally together with other additives, by spraying.

The following Examples illustrate the invention in more detail. They are not to be construed as limiting the instant invention in any manner whatsoever. The invention is declared to cover all changes and modifications of the specific examples which do not constitute departure from the spirit and scope of the invention. Parts and percentages are by weight.

The formulations in the following Examples employ the following compounds:

AO-1 is Irganox® 1010, pentaerythritol tetrakis [3-(3,5-di-tert-butyl-4-hydroxyphenyl) propionate], AO-2 is Irganox® 3114, tris(3,5-di-tert-butyl-4-hydroxybenzyl) isocyanurate, AO-3 is Irganox® 1425, the calcium salt of the monoethyl ester of 3,5-di-tert-butyl-4-hydroxybenzylphosphonic acid, AO-4 is Cyanox® 1790 tris(4-tert-butyl-2,6-dimethyl-3-hydroxybenzyl) isocyanurate, AO-5 is Irganox® 1076, octadecyl 3-(3,5-di-tert-butyl-4-hydroxyphenyl) propionate, H4 is Tinuvin® 622, H5 is Chimassorb® 944, H8 is Tinuvin® 770, H9 is Chimassorb® 119, H10 is Chimassorb® 2020, P-1 is Irgafos® 168, tris(2,4-di-tert-butylphenyl) phosphite, P-2 is Ultranox® 626, bis(2,4-di-tert-butylphenyl) pentaerythritol diphosphite, P-3 is Irgafos® P-EPQ, tetrakis (2,4-di-tert-butylphenyl) 4,4'-biphenylene-diphosphonite, P-4 is Ultranox® 641, formula (J) above, NOH is Irgastab® FS-042, an N,N-di(alkyl) hydroxylamine produced by the direct oxidation of N,N-di(hydrogenated tallow)amine, BF1 is Irganox® HP-136, 3-(3,4-dimethylphenyl)-5,7-di-tert-butyl-benzofuran-2-one, and AOx is Genox™ EP is a di($C_{16}$–$C_{18}$)alkyl methyl amine oxide, CAS# 204933-93-7.

Structures for the HALS compounds are shown supra.

Genox™ and Ultranox® are trademarks of GE Chemicals. Irganox®, Tinuvin®, Chimassorb®, Irgafos® and Irgastab® are trademarks of Ciba Specialty Chemicals Corp. Cyanox® is a trademark of Cytec Corporation.

target melt flow rate of ca. 25 dg/min, an appropriate melt flow rate for injection molding. A clarifier is added at ca. 2200 ppm to enhance the transparency of the molded articles.

The formulations of Table 1 are prepared by dry blending the appropriate additives with the polymer in a Turbula® blender for twenty minutes followed by melt compounding on a single screw extruder at 500° F. (260° C.) using a polyolefin screw fitted with a Maddock mixing section. Table 1 lists the amount of additives in parts per million (ppm) based on the overall formulation. Each formulation also contains 750 ppm calcium stearate, 250 ppm of the dialkylperoxide 2,5-bis(tert-butylperoxyl)-2,5-dimethylhexane (90% tech. grade) and 2200 ppm of the Clarifier-1 (Millad® 3988). Each 2 kg batch is split into 1 kg lots, where 1 kg is multiple pass extruded and the other is injection molded into Type IV tensile bars. The Type IV tensile bars, and a set of 125 mil plaques are split into three sets and treated with gamma irradiation from a $^{60}$Co radiation source at 0, 30 and 60 Kilograys (or 0, 3 and 6 megarads) of exposure. The tensile bars are evaluated for retention of tensile strength and % elongation (at yield, at break) as a function of irradiation dose. The plaques are evaluated for changes in transparency or discoloration as a function of irradiation dose. The irradiated tensile bars, as well as the 125 mil plaques are then oven aged at 60° C. Color and haze development are measured weekly up to 4 weeks on the 125 mil plaques.

YI, initial color, is measured according to ASTM-1295-77 with a DCI SF600 spectrophotometer, large area view, spectral component included, C illuminant, 2° observer. Tensile testing is done on an Instron Series IX Automated Materials Testing System 1.16; program 39 with crosshead speed at 5 in/min.

Results for initial color after exposure to 60 Kilograys of radiation is found in Table 2. Results for tensile strength at yield after exposure to 60 Kilograys of radiation and oven aging for 6 weeks at 60° C. is also found in Table 2.

TABLE 1

| Formulation | AO-1 | AO-2 | AO-3 | H4 | H5 | H9 | H10 | P-1 | NOH | BF1 |
|---|---|---|---|---|---|---|---|---|---|---|
| A | 500 | — | — | — | — | — | — | 1000 | — | — |
| B | — | 500 | — | — | — | — | — | 1000 | — | — |
| C | — | — | 1000 | — | — | — | — | 1000 | — | — |
| D | — | — | — | 1000 | — | — | — | 500 | — | — |
| E | — | — | — | — | 1000 | — | — | 1000 | — | — |
| F | — | — | — | — | — | 1000 | — | 500 | — | — |
| G | — | — | — | — | 1000 | — | — | 500 | 500 | — |
| H | — | — | — | — | — | — | 1000 | 500 | 500 | — |
| I | — | — | — | 1000 | — | — | — | 800 | — | 200 |
| J | — | — | — | — | 1000 | — | — | 800 | — | 200 |
| K | — | — | — | — | — | 1000 | — | 800 | — | 200 |
| L | — | — | — | — | — | — | 1000 | 800 | — | 200 |
| M | — | — | — | — | 1000 | — | — | — | 1000 | — |

EXAMPLE 1

Retention of Physical Properties and Color Control of Gamma Irradiated Polypropylene Copolymer Unipol®, Union Carbide Corporation, gas phase polypropylene random copolymer with an initial melt flow rate of ca. 2 dg/min (2.16 kg, 230°) is via addition of a dialkylperoxide, controlled rheology modified to have a

TABLE 2

| Formulation | YI | Tensile Strength at Yield (psi) |
|---|---|---|
| A | 18 | * |
| B | 16 | * |
| C | 12 | * |
| D | 9 | 4920 |

TABLE 2-continued

| Formulation | YI | Tensile Strength at Yield (psi) |
|---|---|---|
| E | 9 | * |
| F | 9 | 4810 |
| G | 8 | 4960 |
| H | 9 | 5190 |
| I | 11 | 5100 |
| J | 11 | 5080 |
| K | 12 | 5250 |
| L | 11 | 5320 |
| M | 9 | 5200 |

*Denotes failure.

The formulations of the present invention, G–M, show superior initial color and physical property retention after exposure to gamma irradiation, relative to phenolic antioxidant containing formulations, A–C. The present formulations also exhibit comparative initial color and superior physical property retention after exposure to gamma irradiation relative to formulations representing the current state-of-the-art, D–F.

EXAMPLE 2

Retention of Physical Properties and Color Control of Gamma Irradiated HDPE

Solution phase Ziegler/Natta high density polyethylene copolymer (d=0.945 g/cm³) with a nominal melt flow rate of ca. 17 dg/min (2.16 kg @ 190° C.) samples are prepared with the additives of Table 3 by adding a 5% additive concentrate to the "additive free" pelleted base resin in a Turbula® blender for twenty minutes followed by melt compounding on a single screw extruder at 450° F. (232° C.) using a polyolefin screw fitted with a Maddock mixing section. The additive formulations are listed in Table 3 below, amounts of additives are in parts per million (ppm) based on the overall formulation. Each formulation additionally contains 500 ppm of calcium stearate as an acid scavenger. Each 2 kg batch is split into 1 kg lots and 1 kg is multiple pass extruded and the other is injection molded into Type IV tensile bars or compression molded into 125 mil plaques.

The Type IV tensile bars, 125 mil plaques and 1ˢᵗ pass extrusion pellets are split into three sets and treated with gamma irradiation from a ⁶⁰Co radiation source at 0, 30 and 60 Kilograys (or 0, 3 and 6 megarads) of exposure. The tensile bars are evaluated for retention of tensile strength and % elongation (at yield, at break) and the plaques are evaluated for discoloration, all as a function of irradiation dose. The irradiated tensile bars, as well as the 125 mil plaques, are oven aged at 60° C. Color development, tensile strength and % elongation are measured during oven aging at 60° C.

YI, initial color, is measured according to ASTM-1295-77 with a DCI SF600 spectrophotometer, large area view, spectral component included, C illuminant, 2° observer. Tensile testing is done on an Instron Series IX Automated Materials Testing System 1.16; program 39 with crosshead speed at 5 in/min.

Results for initial color after exposure to 60 Kilograys of radiation is found in Table 4. Results for % elongation at break after exposure to 60 Kilograys of radiation and oven aging for 6 months at 60° C. is also found in Table 4.

TABLE 3

| Formulation | AO-1 | AO-2 | AO-3 | H4 | H5 | H10 | P-1 | NOH | BF1 |
|---|---|---|---|---|---|---|---|---|---|
| A | 500 | — | — | — | — | — | 1000 | — | — |
| B | — | 500 | — | — | — | — | 1000 | — | — |
| C | — | — | 500 | — | — | — | 1000 | — | — |
| D | — | — | — | 500 | — | — | 1000 | — | — |
| E | — | — | — | — | 500 | — | 1000 | — | — |
| F | — | — | — | — | — | 500 | 1000 | — | — |
| G | — | — | — | 500 | — | — | 333 | 167 | — |
| H | — | — | — | — | 500 | — | 333 | 167 | — |
| I | — | — | — | — | — | 500 | 333 | 167 | — |
| J | — | — | — | — | — | 500 | 333 | — | 167 |

TABLE 4

| Formulation | YI | % Elongation at Break |
|---|---|---|
| A | 31 | 310 |
| B | 34 | 221 |
| C | 23 | 257 |
| D | 15 | 250 |
| E | 22 | 403 |
| F | 20 | 242 |
| G | 14 | 342 |
| H | 11 | 380 |
| I | 14 | 379 |
| J | 18 | 411 |

The formulations of the present invention, G–J, show superior initial color and physical property retention after exposure to gamma irradiation, relative to phenolic antioxidant containing formulations, A–C, and formulations representing the current state-of-the-art, D–F.

EXAMPLE 3

Retention of Physical Properties and Color Control of Gamma Irradiated Polypropylene Homopolymer for Fiber Polypropylene homopolymer, Ti/Al catalyst, bulk phase process, with a nominal melt flow index of ca. 15 dg/min at 2.16 kg/230° C. is extruded into fibers at 525° F. and a draw ratio of 3.5:1 and 15 Denier per filament. The fibers are knitted into socks. Samples are also compression molded into plaques. The individual formulations each contain a 1:1 blend of calcium stearate/dihydrotalcite at a total level of 500 ppm as an acid scavenger. Formulations are prepared as per Example 1 with the phenolics AO-2, AO-3, AO-4 and Vitamin E, the hindered amines H4, H5, H9 and H110, the phosphites P-1 and P-2, and NOH, BF1 and AOx.

The fibers, socks and plaques are treated with gamma irradiation from a ⁶⁰Co radiation source at 0, 30 and 60 Kilograys (or 0, 3 and 6 megarads) of exposure.

The formulations of the present invention show superior color and/or physical property retention relative to phenolic antioxidant containing formulations and formulations representing the current state-of-the-art containing hindered amine/phosphite combinations.

EXAMPLE 4

Retention of Physical Properties and Color Control of Gamma Irradiated Linear Low Density Polyethylene for Film Unipol®, Union Carbide Corporation, gas phase E/H LLDPE copolymer; Ti/Al catalyst; melt index ca. 1 dg/min.

at 2.16 kg/190° C. is extruded into blown films at 450° F. to produce 1.5 mil films. The individual formulations each contain zinc stearate at a total level of 500 ppm as an acid scavenger. Formulations are prepared as per Example 1 with the phenolics AO-2 and AO-5, the hindered amine H4, the phosphites P-1, P-3 and P-4, and NOH, BF1 and AOx.

The films are treated with gamma irradiation from a $^{60}$Co radiation source at 0, 30 and 60 Kilograys (or 0, 3 and 6 megarads) of exposure.

The films containing the formulations of the present invention show superior physical property and color retention relative to phenolic antioxidant containing formulations and formulations representing the current state-of-the-art containing hindered amine/phosphite combinations.

What is claimed is:

1. A polyolefin article of manufacture of improved strength and/or discoloration resistance, said article being essentially phenol antioxidant-free and having incorporated therein a stabilizer system sufficient to attenuate the deleterious effects of gamma irradiation, said stabilizer system consisting of
    (a) one or more hindered amine stabilizers,
    (b) one or more compounds selected from the group consisting of
       iv.) benzofuranone stabilizers and
    (c) one or more compounds selected from the group of organic phosphites and phosphonites, said article having been subjected to one or more doses of gamma irradiation.

2. An article of manufacture according to claim 1 which is a molded article or a woven or non-woven polyolefin fiber fabric or a polyolefin film.

3. An article of manufacture according to claim 1 wherein the polyolefin is polypropylene or polyethylene.

4. An article of manufacture according to claim 3 wherein the polyolefin is polypropylene random copolymer or high density polyethylene.

5. An article of manufacture according to claim 1 wherein said article is subjected to about 0.5 to about 10 megarads of gamma irradiation.

6. An article of manufacture according to claim 1 wherein the hindered amine stabilizers of component (a) contain at least one group of the formula (I)

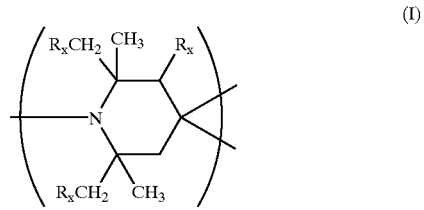

in which $R_x$ is hydrogen or methyl.

7. An article of manufacture according to claim 6 in which the hindered amine stabilizers of component (a) are selected from the group consisting of

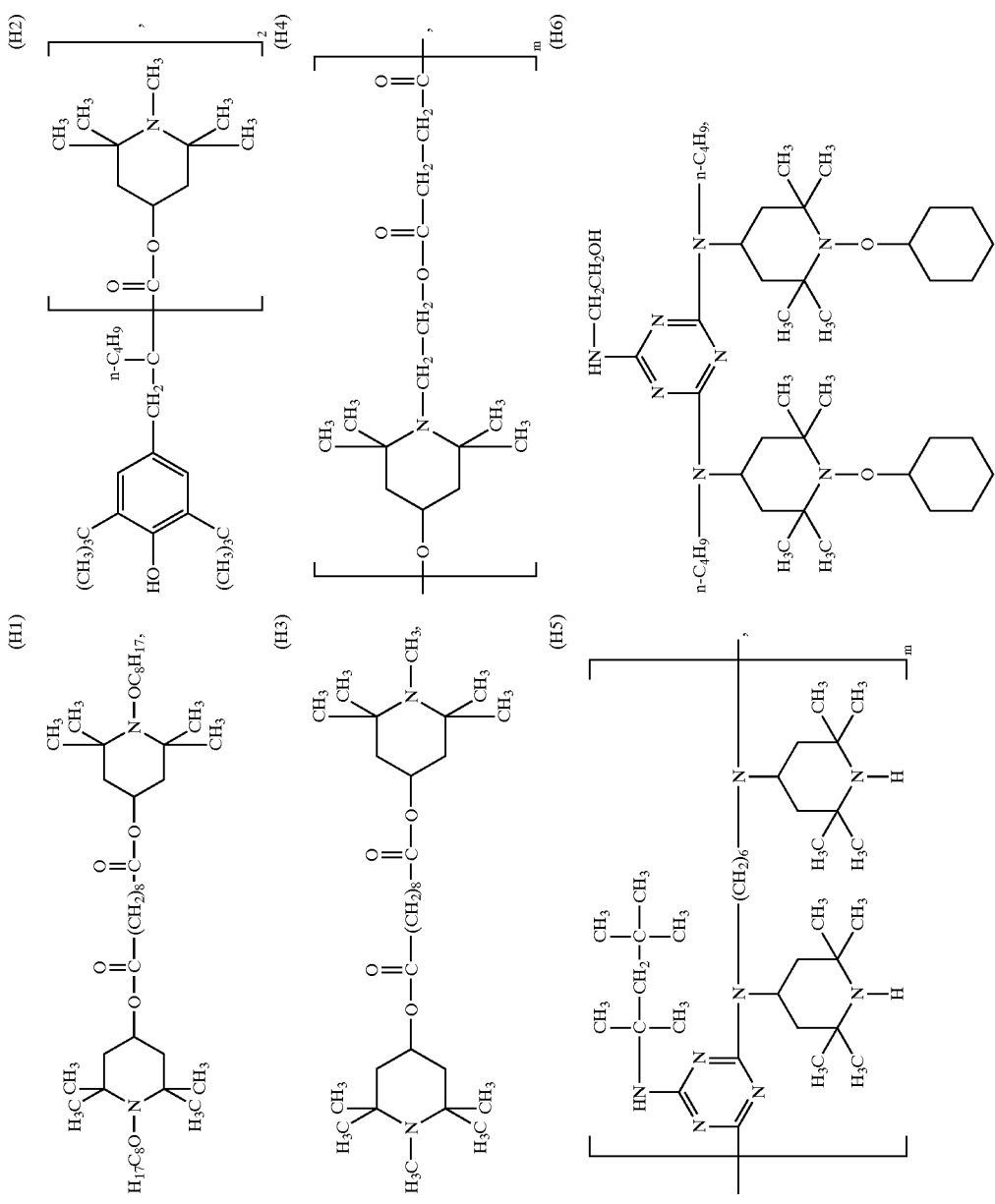

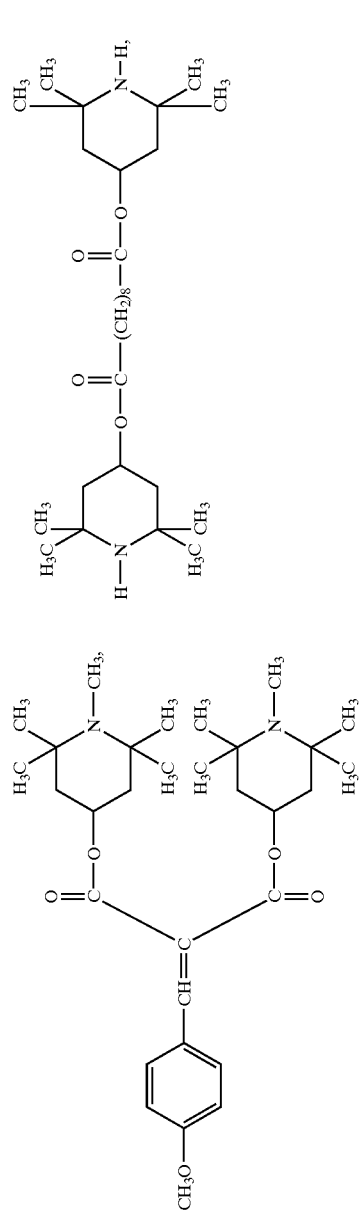
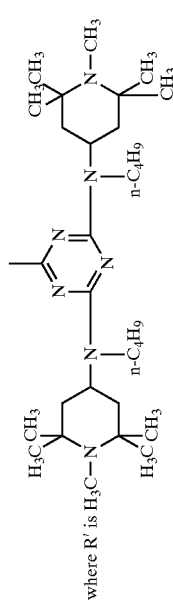
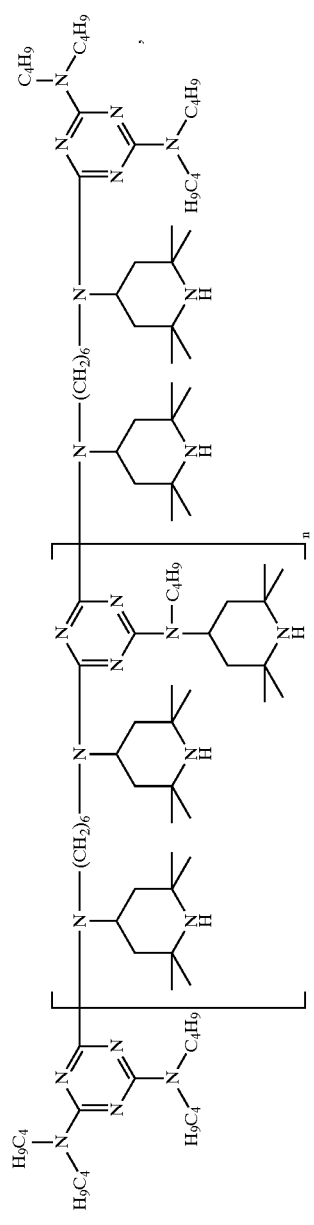

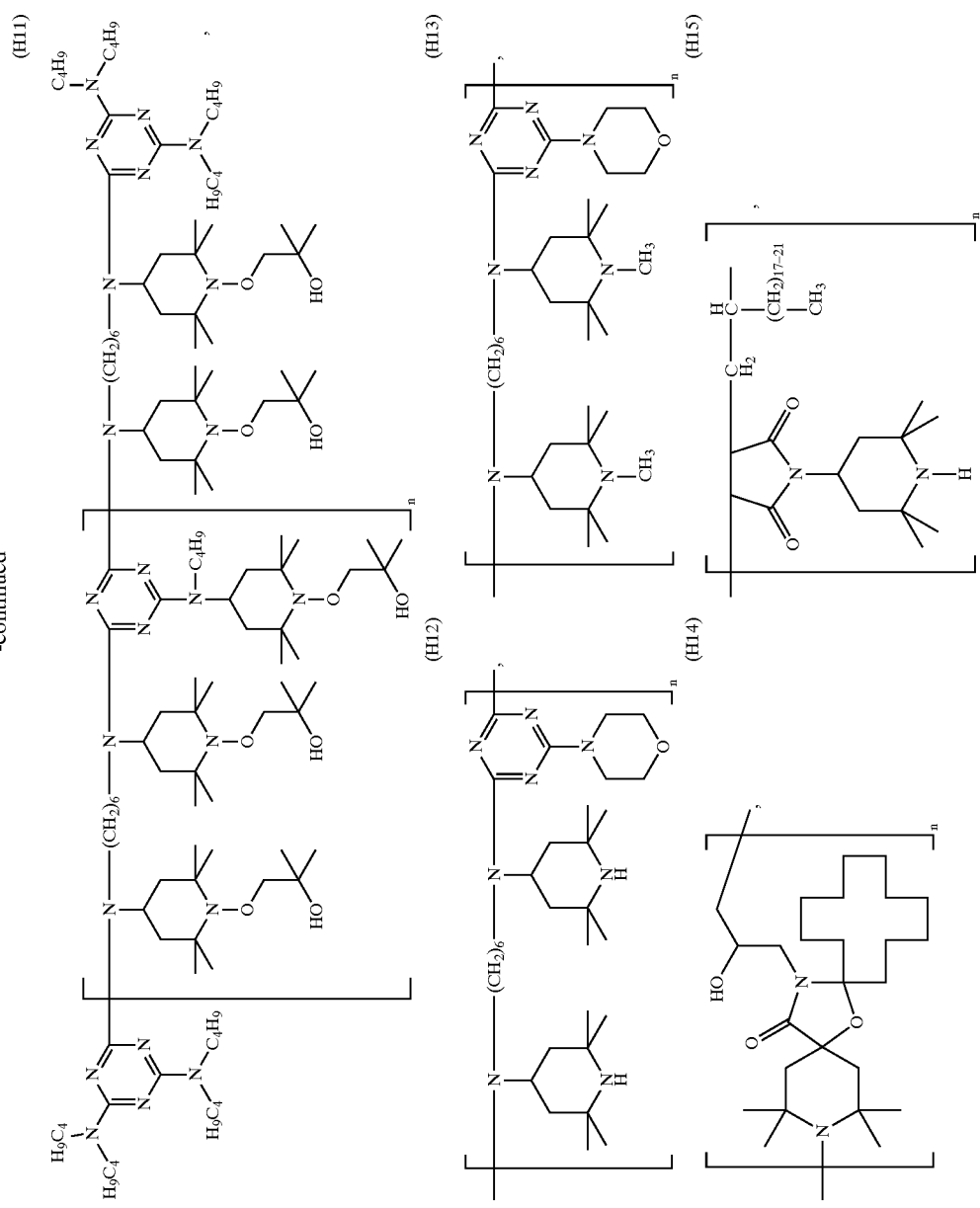

-continued
(H16)
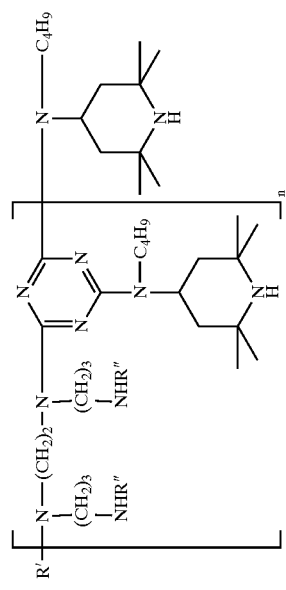
(H17)
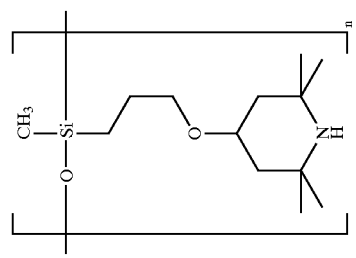
where R' = R" or H
(H18)
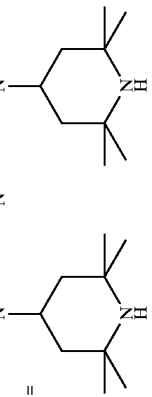
(H19)
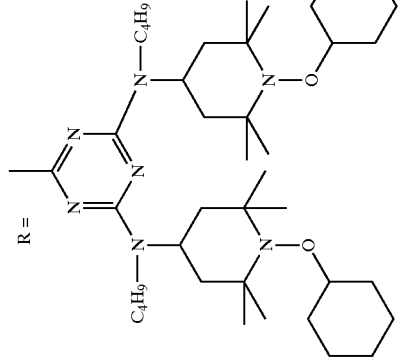
and
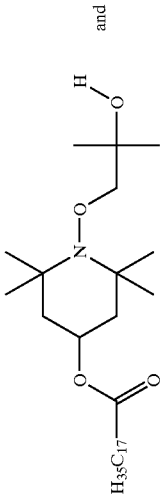

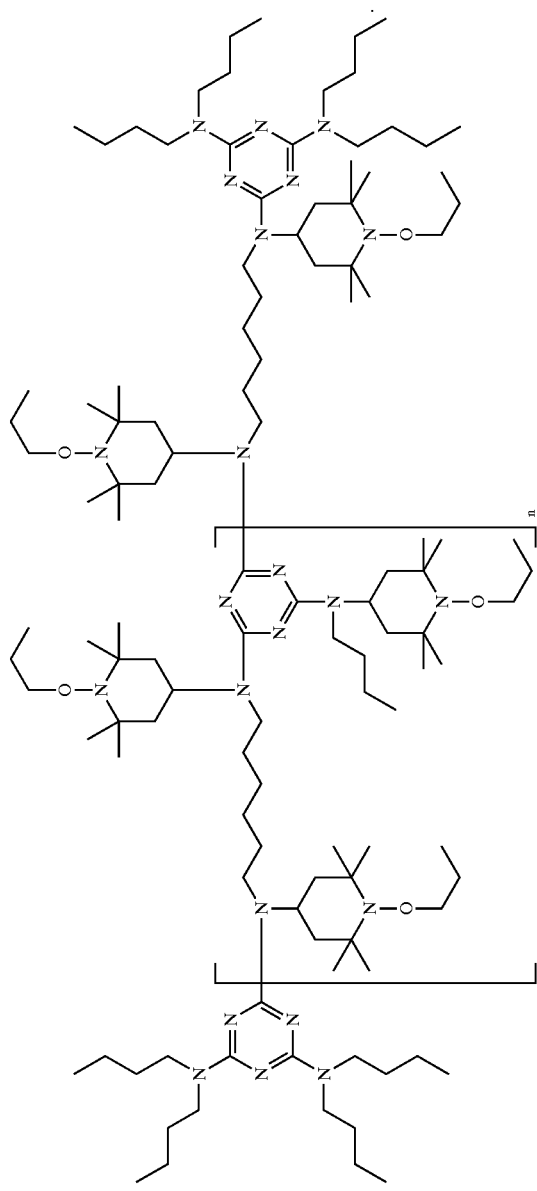

8. An article of manufacture according to claim 1 in which the benzofuranone stabilizers of component iv.) are selected from the group consisting of 3-(4-(2-acetoxyethoxy)phenyl)-5,7-di-ter-butyl-benzofuran-2-one 5,7-di-tert-butyl-3-(4-(2-stearoyloxyethoxy)phenyl)benzofuran-2-one, 3,3'-bis(5,7-di-tert-butyl-3-(4-(2-hydroxyethoxy)phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one and 3-(2,3-dimethylphenyl)-5,7-di-tert-butyl-benzofuran-2-one.

9. An article of manufacture according to claim 8 in the benzofuranone stabilizers are selected from the group consisting of (BF1)

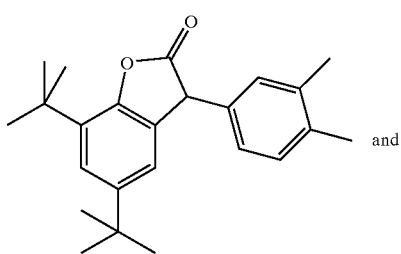

and (BF2)

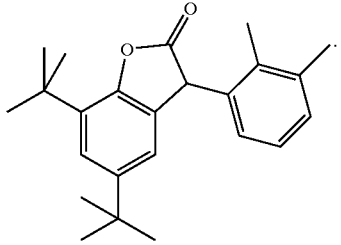

10. An article of manufacture according to claim 1 in which the organic phosphites and phosphonites of component (c) are selected from the group consisting of triphenyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bisisodecyloxypentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis (2,4-di-tert-butylphenyl) 4,4'-biphenylene-diphosphonite, 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2] dioxaphosphocin, bis(2,4-di-tert-butyl-6-methylphenyl) methyl phosphite, bis(2,4di-tert-butyl-6-methylphenyl) ethyl phosphite and 2,2',2"-nitrilo[triethyltris(3,3'5,5'-tetra-tert-butyl-1,1'-biphenyl-2,2'-diyl)phosphite],

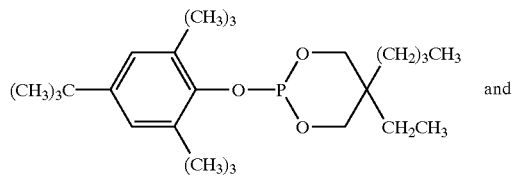 and

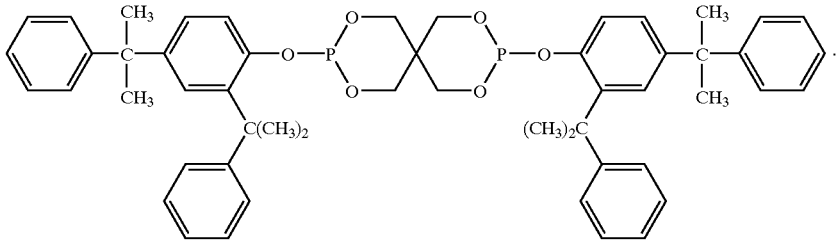

11. An article of manufacture according to claim 1 which has incorporated therein a ternary combination of components (a), (b) and (c) in which component (a) is one or more hindered amine compounds selected from the group consisting of

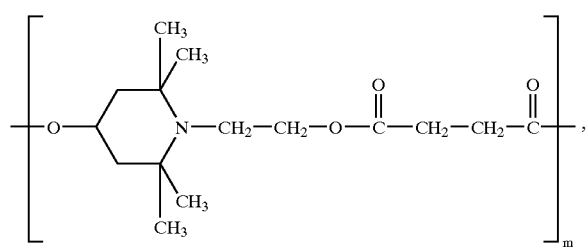
(H4)

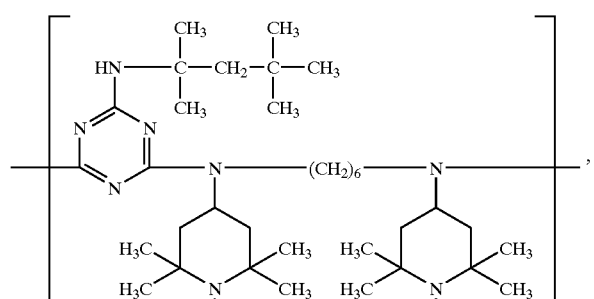
(H5)

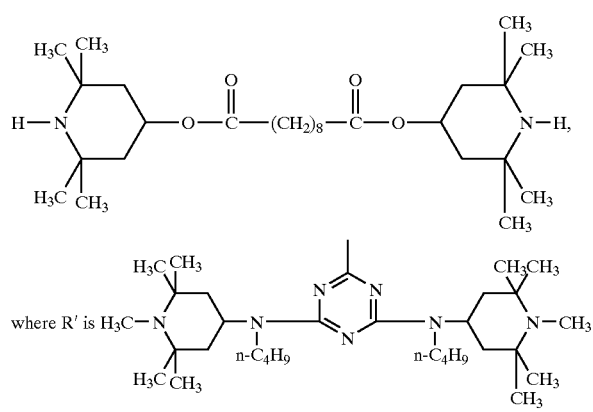
(H8)

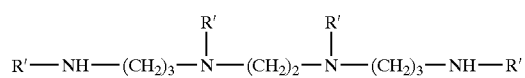

and

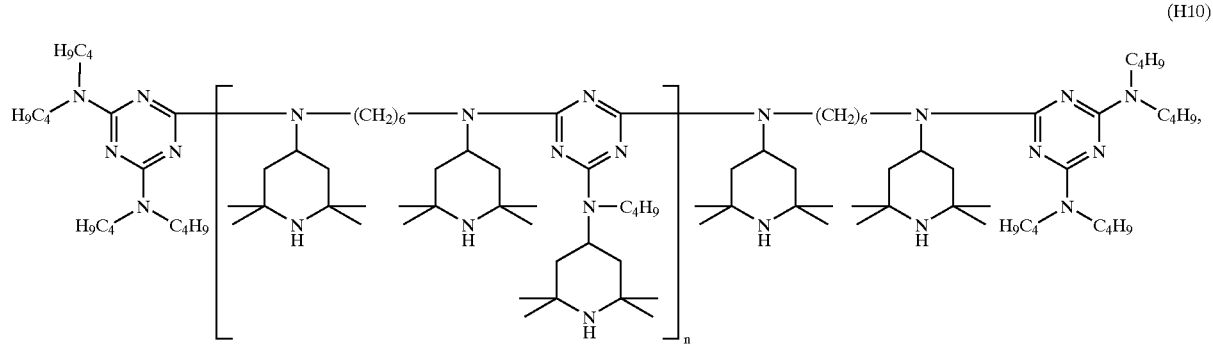
(H10)

component (b) is 3-(3,4-dimethylphenyl)-5,7-di-tert-butyl-benzofuran-2-one and component (c) is tris(2,4-di-tert-butylphenyl) phosphite.

12. An article of manufacture according to claim 1 in which component (a) is incorporated from about 0.01% to about 10% by weight, component (b) is incorporated from about 0.0005% to about 2% by weight, and component (c) is incorporated from about 0.01% to about 5% by weight, each based on the weight of the polyolefin article.

13. An article of manufacture according to claim 1 which additionally has incorporated therein at least one coadditive selected from the group consisting of UV absorbers, thiosynergists, metal stearates, nucleating agents, fillers, reinforcing agents, lubricants, emulsifiers, dyes, pigments, optical brighteners, flame retardants, antistatic agents, blowing agents, polyethylene oxide waxes and mineral oil.

14. A method for imparting strength and/or discoloration resistance to gamma irradiated polyolefin articles, which articles are essentially phenol antioxidant-free, which comprises incorporating therein a stabilizer system consisting of (a) one or more hindered amine stabilizers, (b) one or more compounds selected from the group consisting of iv.) benzofuranone stabilizers and (c) one or more compounds selected from the group of organic phosphites and phosphonites, in an amount sufficient to attenuate the deleterious effects of gamma irradiation.

* * * * *